Jan. 16, 1945.  O. M. HARLOW  2,367,397
COMBINED ELEVATOR AND SAMPLER FOR PLANT PRODUCTS
Filed June 25, 1943  3 Sheets-Sheet 1
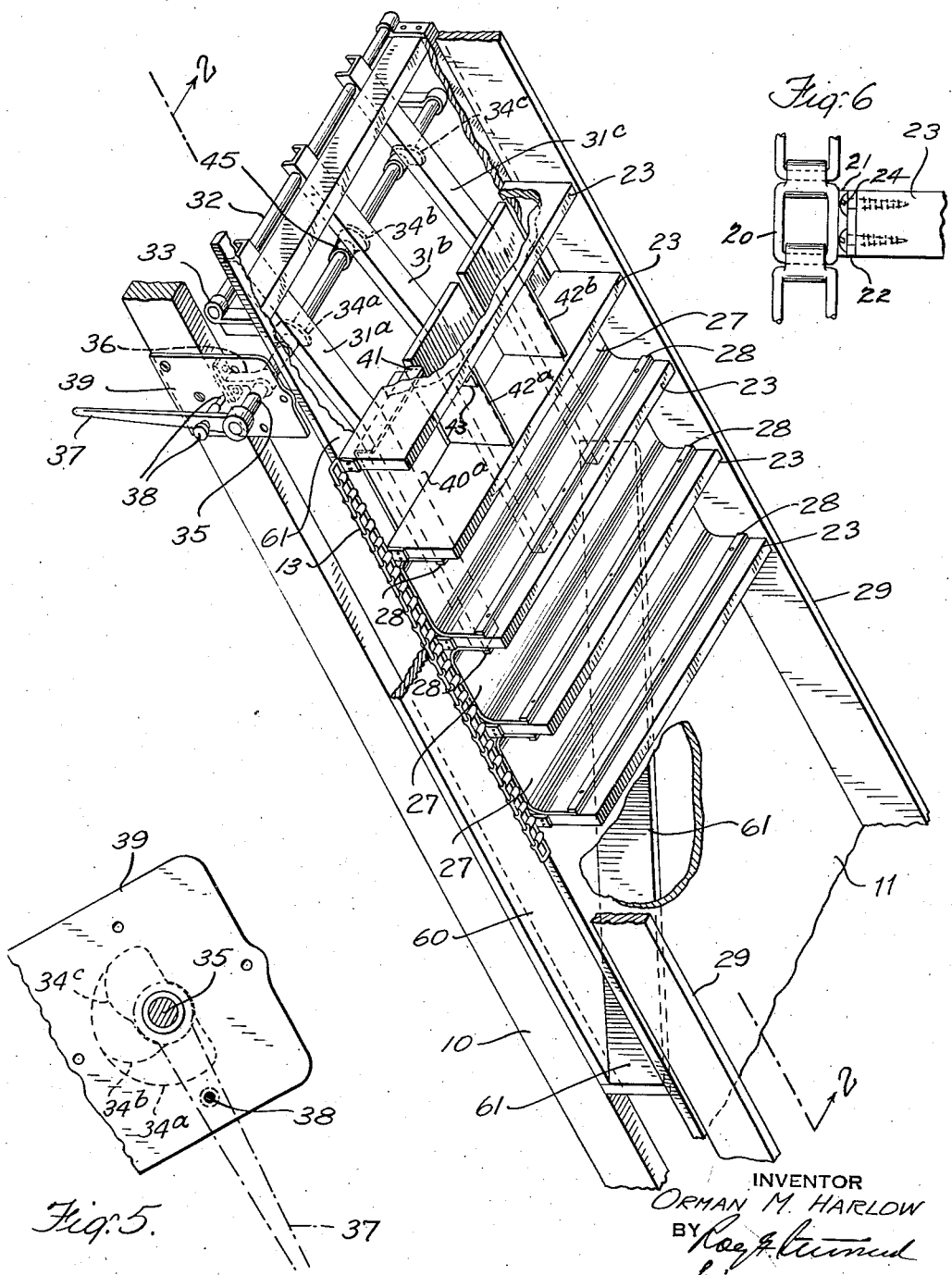
INVENTOR
ORMAN M. HARLOW
BY
his ATTORNEY Jan. 16, 1945. O. M. HARLOW 2,367,397
COMBINED ELEVATOR AND SAMPLER FOR PLANT PRODUCTS
Filed June 25, 1943 3 Sheets-Sheet 2
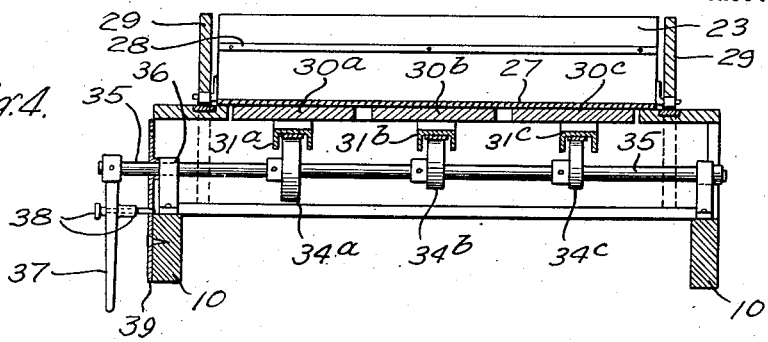
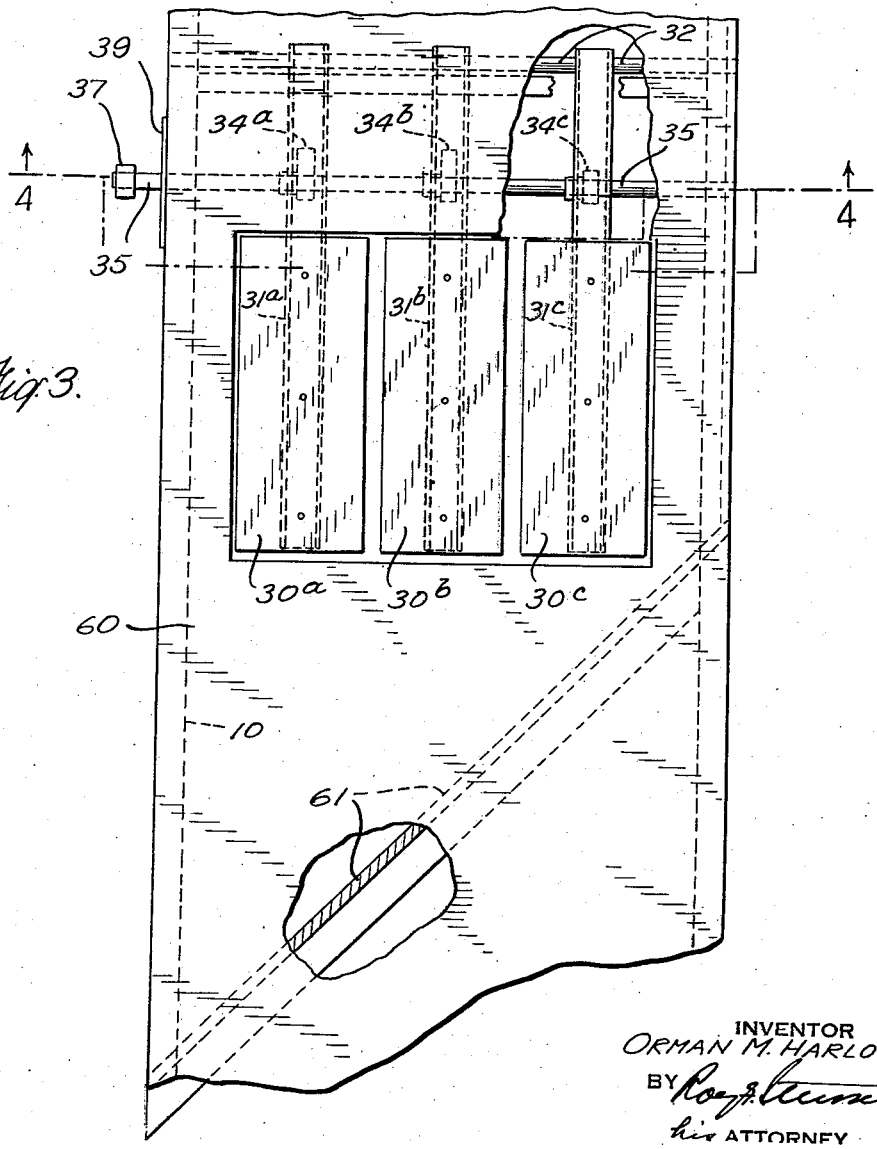
INVENTOR
ORMAN M. HARLOW.
BY
his ATTORNEY Jan. 16, 1945.  O. M. HARLOW  2,367,397
COMBINED ELEVATOR AND SAMPLER FOR PLANT PRODUCTS
Filed June 25, 1943  3 Sheets-Sheet 3
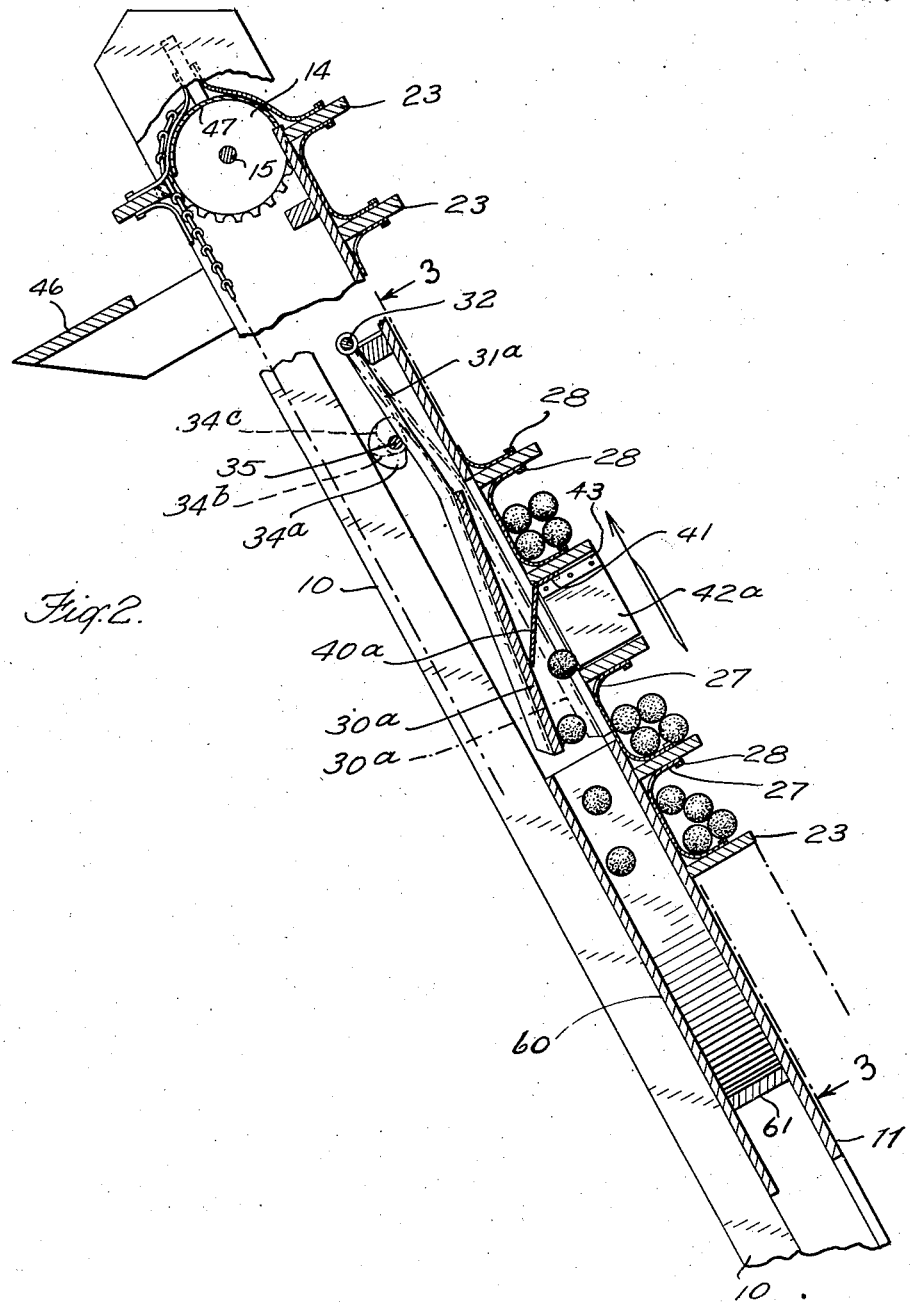
INVENTOR
ORMAN M. HARLOW
BY
his ATTORNEY Patented Jan. 16, 1945

2,367,397

UNITED STATES PATENT OFFICE 2,367,397

COMBINED ELEVATOR AND SAMPLER FOR PLANT PRODUCTS

Orman M. Harlow, Anaheim, Calif., assignor to Brogdex Company, Pomona, Calif., a corporation of California Application June 25, 1943, Serial No. 492,229

10 Claims. (Cl. 73—421)

This invention relates to a combined elevator and sampler for plant products and particularly for citrus fruit and other globular products.

In packing plants that prepare citrus fruits for market, it is frequently the practice to send a varying proportion of the fruit handled to a plant for working up into by-products, instead of shipping such fruit, as such, in the usual way. Sometimes only fruit graded as culls (below marketable grade) is sent to the by-product plant, but market conditions may sometimes warrant diverting more or less marketable fruit to by-products manufacture. In any event, in order to properly appraise the value of the fruit for by-product purposes, and hence the return which the packer and grower should receive for it, a fair sample must be taken of any given lot for laboratory examination and assay. The value of such fruit for by-product purposes varies with its characteristics, such as citric acid content and the like, so that in order to determine the total money credit to be given any individual grower whose fruit is being handled at the packing plant, it is necessary to take enough specimens of the fruit to obtain a representative average sample of the lot which is to be valued, and then to make the requisite laboratory tests of such sample to ascertain the unit value for by-product recovery.

Heretofore, it has been customary to remove manually, at intervals, a small amount of fruit from a conveyor device carrying it, the small amounts or increments thus removed constituting, collectively, the complete or composite sample needed for inspection and laboratory test. This manual method of removing specimens from the traveling stream of fruit is not merely tedious and expensive in labor, but is also likely to be misrepresentative because the person doing the sampling may, quite unintentionally and subconsciously, make a selection when taking the specimens, so that frequently the resultant test sample composed of said specimens is not a fair average of the total quantity of the fruit to be assayed for by-product value.

To overcome the above disadvantage, it has been proposed heretofore by the present applicant to supply mechanical means acting in conjunction with or as a part of a substantially horizontal conveying mechanism to do the sampling automatically. Such horizontal sampling apparatus occupies space in the packing house which could well be used otherwise, and it is therefore desirable that sampling means be available for use in conjunction with an elevating conveyor.

It is an important object of the present invention to provide a sampling apparatus which is also an elevating conveyor, whereby not only is there a saving in floor space, but also, since the fruit may if desired be elevated considerably, it can be discharged by an adjustable or movable gravity chute or conveyor to any desired one of a plurality of bins. Furthermore, because the fruit required for test sample can be taken from the elevating conveyor near the top thereof, the fruit thus removed can be readily discharged into a sample-receiving container by gravity.

Another object of the invention is to provide sampling apparatus that is readily adjustable to vary substantially the quantity ratio of the removed sample to the entire given lot of fruit being handled.

A further object of the invention is to provide a simple and reliable sampling apparatus, which will be economical in construction and operation and at the same time effective in sampling a given lot of fruit handled by the conveyor in such manner that a representative lot of samples which will be a fair average of said lot.

With these general objects in view and some others which will be apparent to those skilled in the art from the description of one embodiment of the invention hereinafter set forth, an apparatus embodying this invention, broadly considered, comprises an elevating conveyor having a plurality of buckets to receive, elevate and discharge the fruit and in addition having at least one bucket having a plurality of compartments, for example, three, which can be dumped independently at a predetermined height of the elevating conveyor below its highest point. It is an important feature of the invention that the said dumping compartments need not all be dumped simultaneously, but one, only, may be dumped, or two, only, or all three and the apparatus is so constructed that it may be set to carry out automatically the desired dumping of one, two, or three compartments at each cycle of the endless conveyor. This enables the inspector or operator of the apparatus to determine the percentage of fruit to be taken from the lot being handled within the limits fixed by the machine. This is very advantageous when dealing with fruit which varies materially in quality, since by taking a large percentage of samples an average of the whole lot sampled is more certain to be obtained; while, on the other hand, in sampling a lot of fruit which runs reasonably uniform, it is convenient and saves laboratory work to take a smaller percentage of fruit for sampling purposes.

The invention will be more particularly described in connection with the accompanying drawings illustrating one embodiment thereof.

In the drawings:

Fig. 1 is a perspective view, partly broken away, of so much of a conveyor as is necessary to illustrate the more essential features of the invention.

Fig. 2 is a longitudinal section of a conveyor, partly broken away, including the upper sprocket mechanism, the line of section following the line 2—2, Fig. 1.

Fig. 3 is a detail view, partly broken away, illustrating the trap-doors and associated parts.

Fig. 4 is a transverse section on the line 4—4, Fig. 3, looking in the direction of the arrow.

Fig. 5 is a detail end elevation of the cam shaft, illustrating in full and dotted lines, the relative positions and configurations of the respective cams.

Fig. 6 is a detail view illustrating the manner in which the flights are connected to the chains.

Referring to the drawings, a suitable framework is provided which may be of any desired construction, having inclined side stringers 10 which support a floor 11. On this floor over the side stringers travels the upper run of an endless conveyor comprising rigid cross-flights 23 carried by chains 13, one at each side margin of the floor, which chains pass around driven sprocket wheels 14, Fig. 2, fixed on a shaft 15 journaled in bearings, not shown, at the top of the elevator, and around suitable sprocket wheels mounted on a shaft, journaled in bearings near the foot of the elevator in the usual way, these sprocket-wheels, shaft, and bearings being omitted from the drawings.

Suitable means is provided for driving the shaft 15, as for example a pulley fixed on the shaft and arranged to be driven by a belt from an electric motor, having a reducing gear, not shown.

The endless chains have at predetermined intervals so-called attachment links 20, Fig. 6, provided with laterally-extending arms 21 carrying wing-plates 22, the attachment links of one chain being in transverse line with the corresponding attachment links of the other chain. To each respective pair of attachment links of the two endless chains, there is attached a transverse flight 23, usually of wood, which is held to the respective wing plates 22 in any suitable way, as by means of screws 24, Fig. 6.

The size of the flights is such that they will move up the inclined floor 11 in contact therewith, on the upper run of the conveyor and will return beneath the floor on the lower run of the conveyor.

Suitable tension sprocket wheels or rollers, not shown, may be provided at the under run of the chains in the usual way to prevent lateral swaying of the under run of said chains and to keep them reasonably tight around the respective upper and lower sprocket wheels. The tension sprocket wheels may be journaled as usual in adjustable bearings mounted in hangers carried by the machine frame in any suitable way.

In all the spaces between the flights, with the exception of one space in the present apparatus, which may be termed a sample-discharging space, flexible aprons 27 are provided to form bottoms, so that the space between flights of each adjacent pair provides a bucket to receive and elevate fruit, the flexible bucket bottom sliding on the supporting floor 11 in the upper run of the elevator.

The aprons 27 may be of any suitable material but most advantageously of material similar to the usual rubber belting. In the construction of the main or non-sampling buckets, both transverse edges of the apron being fastened to the inner faces of the respective pair of flights, as for example, by cleats 28, nailed or screwed to the respective flights.

At each side of the flights are mounted fixed guide-boards 29 which are secured by suitable supports to the frame of the apparatus and serve to prevent the fruit which occupies the spaces between the flights from escaping at the ends of said spaces.

The lower edges of the guide-boards 29 are slightly above the floor 11 to clear the flight-supporting devices carried by the attachment links of the chains, as will be clear from Fig. 1.

At any suitable part of the upper run of the conveyor, but most advantageously near the upper portion thereof, the floor 11 is cut away to provide a plurality of trap-door openings, each of which is arranged to be closed by a trap-door device, three of such being shown in the present apparatus in Fig. 3, these trap-door devices being indicated at 30a, 30b, and 30c, respectively. Each trap-door is mounted on an arm, most advantageously bent as shown in Fig. 1, these being indicated at 31a, 31b and 31c, respectively. These arms are pivoted at their upper ends in any suitable manner. In the apparatus illustrated, they are journaled on a common shaft 32 supported in hangers 33 carried by the framework.

The lower ends of the arms are free to swing downward and upward to a suitable extent. When they are up, the trap-doors which they carry will fill and fit flush with the floor 11, for a reason which will hereinafter appear.

For the purpose of swinging the arms about their pivotal axis, any suitable means may be provided. In the present machine, cams 34a, 34b and 34c, Figs. 1 and 5, are provided, these being fixed on a common cam shaft 35, Fig. 1, journaled in bearings 36, Fig. 4, carried by the framework. To the cam-shaft 35 is fixed a suitable device for rotating the shaft, that is to say, giving it an angular movement about its longitudinal axis to adjust the positions of the three cams and, also, locking or holding the shaft in any position to which it may be adjusted. In the present apparatus, this cam-shaft adjusting means comprises a lever 37 fixed at one end of the shaft, outside the framework, so as to be conveniently accessible. By swinging the lever 37, the cams will be moved angularly. For the purpose of holding the cams in any of their adjusted positions, means are provided for locking the lever 37, in its predetermined adjusted position. As illustrated, the lever is provided with a pin hole, through which may be passed a pin 38 arranged to enter any one of four holes formed in the side of the machine. As shown, a metal plate 39 having four holes is provided, this plate being fixed to the outside of the machine by bolts or screws.

The three cams are arranged to have their peripheral surfaces make contact with the under faces of the respective arms, and each cam has a different configuration so that by adjustment of the cam shaft 35 in one position, all the arms will be up and all the trap-doors closed. In a second adjusted position of the cam-shaft, one trap-door will be open and the other two closed. In a third position of the cam-shaft, two trap-doors will be open and the third closed, and in a fourth position of the cam-shaft all three trap-doors will be open.

In describing the flights, it was mentioned that all the spaces between each pair of adjacent flights with the exception of one had flexible apron bottoms each secured to both flights of the pair to form therewith a fruit-elevating bucket. The excepted space also functions as a fruit-elevating bucket during a part of each cycle of its travel, being likewise provided with apron means constituting the bucket bottom bearing against the supporting floor 11; but unlike the bottoms of the other buckets, the bottom of this bucket or a desired portion thereof is releasable, when unsupported by said floor, to dump the contents of the bucket, or a portion thereof for delivery to a suitable sample-receiving receptacle. In the particular form of apparatus here illustrated, the sampling or sample-discharging bucket thus provided comprises a plurality of fruit-carrying compartments or sub-buckets equal in number, three in this instance, to the trap-door devices aforesaid and respectively aligned therewith in the upward travel of the sampling bucket over said floor 11. Each compartment has a hinged flap bottom formed by an apron 40a suitably secured at its forward or advancing edge to the rear face of the adjacent forward elevator flight as by a cleat 41; while the rear edge of said apron is free and merely trails on the floor 11. The partitions 42a, 42b, which divide the sampling bucket into compartments or smaller sampling buckets, may be formed of relatively stiff yet flexible sheet material with their lower edges positioned to travel fairly close to floor 11, so that no fruit may pass below a partition from one compartment to another. The forward edge of each partition is suitably fixed to the rear face of the adjacent forward flight as by bolting it to an angle iron 43 which is fixed to the forward flight by bolts, as shown in Fig. 2. The rear edge of each partition reaches to and may even touch closely the forward face of the rear flight of the sample-discharging space. The partitions, like the aprons forming the bucket bottoms, are advantageously made of relatively heavy material, such as canvas and rubber similar to the usual rubber belting. They are stiff enough to retain fruit in one compartment even if the adjacent compartment contains no fruit, yet are flexible enough to avoid unnecessary bruising of the fruit. As the partitions are attached only at their forward ends, they permit the adjacent flights to swing freely to their respective radial positions when passing around the forward and rear sprocket wheels.

The configurations of the cams for the present apparatus are clear from Fig. 5. Cam 34a has about 180° of cylindrical surface of maximum radius; cam 34b has 120° of cylindrical surface of the same maximum radius as cam 34a, while cam 34c has about 60° of cylindrical surface of said maximum radius. Cam 34a has about 90° of cylindrical surface of minimum radius; cam 34b about 155° surface of such minimum radius and cam 34c about 225° of such surface of minimum radius, the minimum radii of all three cams being the same. Each cam has its operative surfaces sloped between its surfaces of maximum and minimum radius, so that the respective arm resting on the operative surface will ride smoothly in its angular movement as the cam is moved angularly from one position to another.

It is to be understood that the number of degrees of maximum and minimum radius operative surfaces which the respective cams have is related to the maximum angular movement permitted to the operating lever. In the present case it is assumed that said cam shaft operating lever may move through an angle of about 360°.

Each cam is provided with a hub 45 and is secured to the cam shaft in any suitable way as by a set screw.

The operation of the combined elevator and sampler is as follows:

Plant products such as citrus fruit are supplied by a suitable conveyor or chute, not shown, to the lower end of the upper run of the conveyor, most advantageously in a wide enough stream of fruit to supply the spaces between the flights with all the fruit they will elevate without losing any by overflow.

The illustrated construction of the elevator buckets with flexible bottoms minimizes injury to the fruit and also allows the flights, which are rigid and so mounted on the endless conveyor chains as to extend outwardly beyond and substantially perpendicular to the plane thereof throughout the travel of said chains, and thereby to take radial positions in going around in an arc at the upper and lower sprocket wheels. This is of considerable advantage at the upper end of the elevator because the open upper ends of the said buckets widen to ensure the free discharge of the contents of such buckets. Also the relative movements of the flights and of the flexible bottom tend to prevent any packing or jamming of the fruit in the respective buckets, which, if it occurred, would be followed by a sudden late release of the fruit after the buckets had turned to a nearly upside-down position. In other words, by the special formation of the buckets referred to, the fruit is gently rolled from the buckets into the discharge chute or conveyor 46, Fig. 2, which conducts the fruit to the respective receiving bin or compartment. All the fruit elevated by the said special buckets is merely elevated and discharged at the upper end.

The multi-compartment sample-discharging bucket, with its releasable sub-bucket or compartment bottoms, also receives fruit fed to the conveyor near its lower end, this fruit being retained in the separate compartments. The fruit in these compartments rests on the flexible bottoms thereof which, as has already been pointed out, trail or slide over the floor 11 as the elevator ascends. If none of the aforesaid trap doors in the floor is open, the sample bucket will carry its entire load of fruit to the upper end of the elevator and there discharge said fruit in the same way as do the other buckets. If, however, a trap door be swung down, the trailing hinged bottom of the compartment traveling in line with the dropped trap-door section will not be supported when it reaches the said trap-door section and hence will be released and swing angularly downward to discharge the fruit from its compartment, such fruit moving down the then rearwardly and downwardly inclined upper surface of the flexible bottom and of the dropped trap-door section into a suitable chute compartment provided beneath the upper run of the elevator, as will be more fully described hereinafter.

There is provided a curved shield 47, Fig. 2, between the upper set of sprocket wheels to support the trailing flexible bottoms as they pass around at the top of the conveyor.

Whether the fruit shall be discharged from one, two or three compartments of the sampling or sample-discharging bucket, is a matter that can be controlled and predetermined by the setting of the lever 37 which adjusts the positions of the cam-shaft and cams and thereby aids in determining the percentage of samples taken from the total amount of fruit being elevated at one circuit or cycle of the endless chains and their flights. For example, if the elevator has one sample discharging bucket and 99 mere elevating buckets, assuming all buckets to be of the same capacity and equally filled with fruit when ascending, and if all three trap-door sections be set in their dropped positions, so that all the fruit in all the compartments of the sample-discharging bucket will be discharged at each cycle of the endless conveyor, the sample discharged may be figured as one per cent of all the fruit starting up the elevator. If, however, only one trap-door section be in its dropped position, the samples taken may be figured as one-third of one percent; if only two trap-door sections be dropped the samples may be figured as two-thirds of one per cent of the fruit starting up the elevator.

The number of sample-discharging buckets in an elevator may be more than one, if desired, and in this way the percentage of samples to the total fruit starting up the elevator may be increased as desired. In other words, the basic percentage of the samples is determined by the ratio of the number of sample-discharging buckets to the total number of buckets in the elevator, and the final percentage will be determined by the number of dropped trap-door sections. Where more than one sample-discharging bucket is provided in an elevator, it is best to have them distributed uniformly along the endless chains in order to obtain a better general average of the fruit. For example, if there are 100 buckets, of which two are sample-discharging buckets, each having three compartments, the buckets will be arranged in two groups of 50 buckets each, each group having one sample-discharging bucket followed by 49 mere elevating buckets. With this arrangement, the percentage of samples obtainable will be 2% if all three trap-doors are dropped; two-thirds of one percent if only one trap-door section is dropped; and one and one-third percent if two trap-door sections, only, are dropped.

It is one of the important advantages of the invention that it readily allows a certain latitude of construction to obtain any usually required percentage of sample.

In order to conduct away the samples, the trap-door sections are arranged to discharge onto the floor 60 of a chute compartment which is immediately subadjacent the elevator floor 11 and is of sufficient extent transversely of said floor to receive the discharge from all the trap-door sections. This compartment has a sloping lower wall or bottom 61 arranged to discharge the fruit laterally, into one or more suitable containers, which may serve as measuring vessels if desired to check the operation of the sampler.

What is claimed is:

1. In a plant product elevating and sampling apparatus, an endless bucket elevator having its upper run arranged at an incline, having a relatively large number of main elevating buckets arranged to carry plant products from a lower level to a higher level and to discharge them at said higher level, and having at least one sample-discharging bucket provided with a releasable bottom, arranged to receive plant products at the lower level and carry them upward, in combination with controllable means for releasing the bottom of said sample-discharging bucket and thereby dumping the same before its arrival at the said higher level, and means for receiving the plant products dumped by the sample-discharging bucket separately from the plant products discharged by the main elevating buckets.

2. In a plant product elevating and sampling apparatus, an endless bucket elevator having its upper run arranged at an incline, having a relatively large number of main elevating buckets arranged to carry plant products from a lower level to a higher level and to discharge them at said higher level, and having at least one sample-discharging bucket partitioned to form a plurality of compartments each provided with a separate bottom independently movable downward to discharge plant products from its respective compartment, said sample-discharging bucket being arranged to receive plant products at the lower level and carry them upward, in combination with controllable means operable to cause such downward movement of one or more of the compartment bottoms and thereby to dump at least a part of the contents of the sample-discharging bucket before its arrival at the said higher level, and means for receiving the plant products dumped by the sample-discharging bucket separately from the plant products discharged by the main elevating buckets.

3. In a plant product elevating and sampling apparatus, comprising endless chains whose upper runs are arranged at an incline, sprocket wheels around which said endless chains travel, and means for driving said chains so their upper runs will move upward on the incline, the combination, with a series of elevator flights carried by said endless chains and so mounted thereon as to extend outwardly beyond the plane of said chains throughout their path of travel, guard rails at each side of said flights, and a series of flexible bottoms occupying a corresponding series of spaces between adjacent flights and secured at their respective forward and rearward edges to the respective flights, whereby conveyor buckets are formed in the spaces between the flights to elevate plant products up the incline and as said buckets pass around in an arc at the upper end of the elevator, the outer ends of said buckets widen to aid in discharging the plant products and cause a gentle discharge of them from the respective buckets.

4. In a plant product elevating and sampling apparatus, comprising an endless conveyor having a series of main elevating buckets, the upper run of said conveyor being arranged to travel upward at an incline, and means for driving said endless conveyor, the combination with at least two conveyor flights carried by said conveyor and arranged adjacent to each other to form a sample receiving and discharging space, of a flexible bottom for said space secured at its forward end to its forward flight and free at its rear end, an inclined floor on which said flexible bottom trails, said floor having a trap door opening in the path of travel of said flexible bottom, a trap-door arranged to enter said trap-door opening, and controllable means for raising and lowering the trap-door, whereby plant products may be discharged from said sample receiving and discharging space when the trap-door is lowered.

5. In a plant product elevating and sampling apparatus, comprising an endless conveyor having a series of main elevating buckets, the upper run of said conveyor being arranged to travel upward at an incline, and means for driving said endless conveyor, the combination with at least two conveyor flights carried by said conveyor and arranged adjacent to each other to form a sample receiving and discharging space, of partition means dividing said space into compartments, a separate bottom member for each compartment connected at its forward end to its forward flight and free to swing downward at its rear end, an inclined floor on which said bottom members trail, said floor having separate trap door openings each arranged in the path of travel of its respective bottom member, a plurality of trap-doors each arranged to enter its respective trap-door opening, and controllable means for raising and lowering each trap-door whereby plant products may be discharged from one or more of said compartments according to the number of trap-doors lowered.

6. In a plant product elevating and sampling apparatus, comprising an endless conveyor having a series of main elevating buckets, the upper run of said conveyor being arranged to travel upward at an incline, and means for driving said endless conveyor, the combination with at least two conveyor flights carried by said conveyor and arranged adjacent to each other to form a sample receiving and discharging space, of partition means dividing said space into compartments, a separate bottom member for each compartment secured at its forward end to its forward flight and free at its rear end, an inclined floor on which said flexible bottom members trail, said floor having separate trap door openings each arranged in the path of travel of its respective flexible bottom member, a plurality of trap-doors each arranged to enter its respective trap-door opening, and controllable means for raising and lowering each trap-door whereby plant products may be discharged from one or more of said compartments according to the number of trap-doors lowered.

7. In a plant product elevating and sampling apparatus, the combination, with an inclined floor having a plurality of trap-door openings, and trap-doors therefor, an endless conveyor whose upper run is above the floor, said conveyor having a plurality of main elevating buckets and at least one pair of adjacent elevator flights spaced to form a sample receiving and discharging space, of partitions dividing said space into compartments, a flexible bottom member for each compartment having its forward end secured to its forward flight and its rear end free to trail along the floor when at the upper run and to drop through its respective trap-door opening when the trap-door of said opening is lowered, a lever device for each trap door, a cam for each lever device, a common cam-operating shaft on which each cam is fixed, and means for moving said cam-shaft to control the opening and closing of the trap-doors.

8. In sampling apparatus, the combination defined in claim 7, wherein the cams are so contoured and are set in such angular relation on said cam-operating shaft that all or less than all said trap-doors may be open at a time, as desired.

9. In sampling apparatus, the combination, with an endless conveyor comprising a series of conveyor buckets, most of which are main conveyor buckets and at least one is a sampling bucket, and a supporting floor along which the bottoms of all said buckets slide when the buckets are traveling loaded, the sampling bucket alone having a bottom member adapted and arranged to open downward when unsupported; of a trap-door controlling a sample-discharge opening in the floor disposed in the path of travel of the loaded buckets and large enough to permit downward movement of said sampling bucket bottom member, and means for opening said trap-door whereby to permit said bottom member of the sampling bucket, upon arrival at said opening, to drop and permit said bucket to discharge at least a part of its load.

10. In sampling apparatus, the combination, with an endless conveyor comprising a series of conveyor buckets, most of which are main conveyor buckets and at least one is a sampling bucket divided into compartments aligned transversely to the direction of conveyor travel, and a supporting floor on which the bottoms of all said buckets slide when the buckets are traveling loaded, each compartment of said sampling bucket having a bottom member adapted and arranged to open downward when unsupported; of a plurality of trap-doors, corresponding in number to the compartment bottom members and controlling sample-discharge openings respectively disposed in their paths of travel, and adjustable means operable to maintain all or less than all said trap-doors open at a time, as desired.

ORMAN M. HARLOW.